United States Patent [19]

Cameron

[11] Patent Number: 5,120,681

[45] Date of Patent: Jun. 9, 1992

[54] CERAMIC COMPOSITES CONTAINING SPINEL, SILICON CARBIDE, AND BORON CARBIDE

[75] Inventor: Craig P. Cameron, Ellicott City, Md.

[73] Assignee: W. R. Grace & Co.-Conn., New York, N.Y.

[21] Appl. No.: 704,497

[22] Filed: May 23, 1991

[51] Int. Cl.⁵ .............................................. C04B 35/56
[52] U.S. Cl. ........................................ 501/89; 501/91; 501/120; 419/45
[58] Field of Search ............................. 501/89, 91, 120; 419/15, 45

[56] References Cited

U.S. PATENT DOCUMENTS

| | | | |
|---|---|---|---|
| 4,770,673 | 9/1988 | Ketcham et al. | 51/309 |
| 4,806,206 | 2/1989 | Kamijo et al. | 162/145 |
| 4,879,262 | 11/1989 | Halverson et al. | 501/87 |
| 4,891,341 | 1/1990 | Cutler | 501/89 |
| 4,935,387 | 6/1990 | Beall et al. | 501/3 |

*Primary Examiner*—Karl Group
*Attorney, Agent, or Firm*—Steven Capella

[57] ABSTRACT

A composition containing $MgAl_2O_4$, SiC, and $B_4C$ is produced by the method comprising:
(a) combining sources of magnesium silicate, $B_2O_3$, Al and C to form a mixture, and
(b) heating the mixture whereby the sources react to form $MgAl_2O_4$, SiC, and $B_4C$.

A sintered material containing $MgAl_2O_4$, SiC, and $B_4C$, may be produced by the method comprising:
(a) combining sources of magnesium silicate, $B_2O_3$, Al and C to form a mixture,
(b) compacting the mixture into a shape,
(c) heating the shape, whereby the sources react to form $MgAl_2O_4$, SiC, and $B_4C$, and
(d) sintering the reacted shape.

Possible sources of magnesium silicate are talc, vermiculite and mica.

21 Claims, No Drawings

CERAMIC COMPOSITES CONTAINING SPINEL, SILICON CARBIDE, AND BORON CARBIDE

This invention was made with Government support under Contract N00014-87-C-0515 awarded by the Office of Naval Research, Dept. of the Navy. The Government has certain rights in the invention.

BACKGROUND OF THE INVENTION

Structural ceramic materials generally show many advantages in high performance materials applications because of their high mechanical strength and hardness properties and low weight. These features make many of these ceramic materials attractive for use in military applications such as armor for vehicles. Numerous non-military applications for these materials are just beginning to be explored and implemented.

Unfortunately, a major disadvantage of most structural ceramic materials is high cost. High cost limits the use of these materials both in military and non-military applications.

The high cost of many structural ceramics may be partly attributed to high cost of the starting ceramic powders which are to be shaped and densified to form structural ceramic parts. The starting powders are often made by energy-intensive processes or by other expensive methods adapted to produce high purity starting powders. Generally, it has been preferred to minimize the impurity contents of starting powders in order to maximize the performance of the ultimate ceramic part.

Some prior art processes have used chemical reactions in the formation of ceramic composites. In U.S. Pat. No. 4,879,262, $B_4C$-$TiB_2$ composites were prepared by forming a powder compact containing B, C, and Ti or hydride or oxide powders thereof. The mixture was then combusted to yield a $B_4C$-$TiB_2$ composite. The reactants used in that process still entail substantial cost. Moreover, there is no apparent disclosure in the prior art showing the production of $MgAl_2O_4$-$SiC$-$B_4C$ composites which have advantageous properties for armor applications.

Needless to say, it would be highly desirable to be able to produce such desirable ceramic composites at low cost. Such an advance would allow for military armor uses and for wider non-military structural ceramic applications.

SUMMARY OF THE INVENTION

The present invention overcomes many of the problems of high cost structural ceramics. Namely, the invention provides a method of forming structural ceramic composites containing substantial amounts of $B_4C$ and SiC from low cost raw materials.

In one aspect, the invention encompasses a method of producing a composition containing $MgAl_2O_4$, SiC, and $B_4C$, the method comprising:
(a) combining sources of magnesium silicate, $B_2O_3$, Al and C to form a mixture, and
(b) heating the mixture whereby the sources react to form $MgAl_2O_4$, SiC, and $B_4C$.

In a further aspect, the invention encompasses a method of producing a sintered material containing $MgAl_2O_4$, SiC, and $B_4C$, the method comprising:
(a) combining sources of magnesium silicate, $B_2O_3$, Al and C to form a mixture,
(b) compacting the mixture into a shape,
(c) heating the shape, whereby the sources react to form $MgAl_2O_4$, SiC, and $B_4C$, and
(d) sintering the reacted shape.

Possible sources of magnesium silicate are talc, vermiculite and mica.

The invention also encompasses ceramic compositions and sintered ceramics comprising $MgAl_2O_4$, SiC and $B_4C$.

In a further aspect, these compositions and sintered ceramics may also contain alumina.

DETAILED DESCRIPTION OF THE INVENTION

The processes encompassed by the invention start by forming an initial mixture of the raw material reactants (i.e., sources of magnesium silicate, Al, C and $B_2O_3$. The mixture may be compacted or shaped after mixing if desired. The mixture is then heated to initiate the reaction to form the desired ceramic composition. If a sintered ceramic is desired, the composition is further treated to cause the sintering.

The magnesium silicate source is preferably an inexpensive mineral source such as talc, vermiculite, or mica. The aluminum source is preferably aluminum metal powder. The carbon source is preferably elemental carbon and/or a carbonizable binder. The boron oxide source is preferably simply $B_2O_3$ powder. The reactants may be mixed by wet (non-aqueous) or dry mixing. The mixing may use any conventional means such as milling.

The initial reactant mixture is then preferably compacted into a shape. This may be performed by any conventional technique such as pressing. Carbonizable or volatilizable binders may be employed to facilitate compaction.

The reactant mixture is then heated to initiate the reaction (600°–1300° C.). The heating is preferably performed in vacuum or an inert atmosphere. For reactant mixtures containing talc, the general reaction can be described by the following formula:

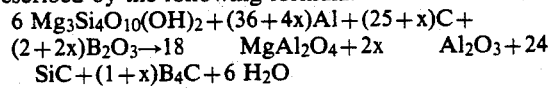

wherein x is greater than or equal to zero.

Once the mixture has been reacted, the resultant ceramic composition may then be sintered using any conventional technique such as hot pressing, pressureless sintering or hot isostatic pressing. When hot pressing is used, the composition is further heated to at least about 1700° C. under a pressure of at least 1000 PSI, preferably at least about 1350 PSI.

The proportions of reactants may be varied from the stoichiometry of the reaction. Also, various inert materials may be added to the initial mixture.

The following example is presented merely to illustrate the invention. It should be understood that the invention is not limited to the reactions, reactants or techniques recited in the example.

EXAMPLE

Talc, aluminum powder, carbon powder, and boron oxide powder were combined in stoichiometric proportions according to the equation:

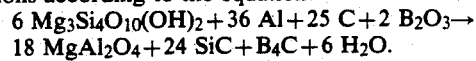

The powders were wet milled in isopropanol using 3/16" diameter $Si_3N_4$ balls as the milling media. The milled mixture was then dried under vacuum at 50° C.

for about 24 hours. The dried powder was then loaded into a graphite die and heated under vacuum at a rate of 10° C./min up to 600° C. At that point, 250 mm Hg of argon gas was added to the chamber. Heating was continued to 900° C. at 10° C./min and then to 1300° C. at 5° C./min. At 1300° C., an axial pressure of 1350 PSI was applied to the reacted mixture. The temperature was increased under this load to 1700° C. and held there for about 1 hour. The load was then removed and the sintered part was allowed to cool in situ.

What is claimed is:

1. A composition comprising $MgAl_2O_4$, SiC, and $B_4C$.

2. The composition of claim 1 consisting essentially of $MgAl_2O_4$, SiC, and $B_4C$.

3. The composition of claim 1 further comprising alumina.

4. The composition of claim 2 wherein $MgAl_2O_4$ and SiC are present in a molar ratio of about 3:4.

5. A sintered ceramic material comprising $MgAl_2O_4$, SiC, and $B_4C$.

6. The sintered ceramic of claim 5 wherein said material consists essentially of $MgAl_2O_4$, SiC, and $B_4C$.

7. The sintered ceramic of claim 6 wherein $MgAl_2O_4$ and SiC are present in a molar ratio of about 3:4.

8. The sintered ceramic of claim 5 further comprising $Al_2O_3$.

9. A cermet composition comprising $MgAl_2O_4$, SiC, $Al_2O_3$, $B_4C$ and free aluminum.

10. A method of producing a composition containing $MgAl_2O_4$, SiC, and $B_4C$, said method comprising:
   (a) combining sources of magnesium silicate, $B_2O_3$, Al and C to form a mixture, and
   (b) heating said mixture whereby said sources react to form $MgAl_2O_4$, SiC, and $B_4C$.

11. The method of claim 10 wherein said mixture is compacted prior to said heating.

12. The method of claim 10 wherein said source of magnesium silicate is selected from the group consisting of talc, vermiculite, and mica.

13. The method of claim 12 wherein said sources consist essentially of talc, $B_2O_3$, elemental Al and elemental C respectively.

14. A method of producing a sintered material containing $MgAl_2O_4$, SiC, and $B_4C$, said method comprising:
   (a) combining sources of magnesium silicate, $B_2O_3$, Al and C to form a mixture,
   (b) compacting said mixture into a shape,
   (c) heating said shape, whereby said sources react to form $MgAl_2O_4$, SiC, and $B_4C$, and
   (d) sintering said reacted shape.

15. The method of claim 14 wherein said source of magnesium silicate comprises talc.

16. The method of claim 14 wherein said sintering is performed by pressureless sintering.

17. The method of claim 14 wherein said sintering is performed by hot pressing.

18. The method of claim 10 wherein said reacting in step (b) includes the reaction:

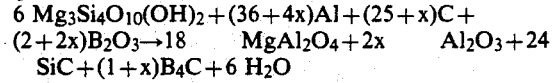

wherein x is greater than or equal to zero.

19. The method of claim 14 wherein said reacting in step (c) includes the reaction:

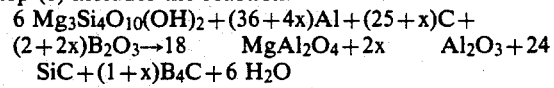

wherein x is greater than or equal to zero.

20. The method of claim 18 wherein at least one of said sources is present in excess of stoichiometric proportions.

21. The method of claim 19 wherein at least one of said sources is present in excess of stoichiometric proportions.

* * * * *